United States Patent [19]
Speth et al.

[11] Patent Number: 5,854,544
[45] Date of Patent: Dec. 29, 1998

[54] VELOCITY CONTROL WITH LIMITED JOLTING

[75] Inventors: Wolfgang Speth, Grossbottwar; Wilhelm Westermeyer, Nürnberg, both of Germany

[73] Assignee: Siemens Aktiengesellschaft, Munich, Germany

[21] Appl. No.: 817,667

[22] PCT Filed: Oct. 9, 1995

[86] PCT No.: PCT/EP95/03973

§ 371 Date: Jun. 27, 1997

§ 102(e) Date: Jun. 27, 1997

[87] PCT Pub. No.: WO96/12992

PCT Pub. Date: May 2, 1996

[30] Foreign Application Priority Data

Oct. 21, 1994 [EP] European Pat. Off. ........... 94116655.5

[51] Int. Cl.[6] ................................................. G05B 19/416
[52] U.S. Cl. ...................... 318/270; 318/568.18; 318/630
[58] Field of Search ........................ 318/568.17, 568.18, 318/623, 630, 268, 269, 270, 271, 273, 274, 276

[56] References Cited

U.S. PATENT DOCUMENTS 4,603,286  7/1986  Sakano ..................................... 318/615
5,070,287  12/1991  Boehm .
5,510,996  4/1996  Kuhn et al. ..................... 318/568.22 X
5,652,490  7/1997  Bradshaw et al. ....................... 318/615

FOREIGN PATENT DOCUMENTS

| 0 089 156 | 9/1983 | European Pat. Off. . |
| 0 191 103 | 8/1986 | European Pat. Off. . |
| 0 268 491 | 5/1988 | European Pat. Off. . |
| 0 299 080 | 1/1989 | European Pat. Off. . |
| 0 419 706 | 4/1991 | European Pat. Off. . |
| 0 440 805 | 8/1991 | European Pat. Off. . |
| 0 477 412 | 4/1992 | European Pat. Off. . |
| 0 530 033 | 3/1993 | European Pat. Off. . |
| WO 94/12916 | 6/1994 | WIPO . |

*Primary Examiner*—Bentsu Ro
*Attorney, Agent, or Firm*—Kenyon & Kenyon

[57] ABSTRACT

The invention relates to a method for controlling the speed of electric drives, in particular for machine tool controllers, acceleration shocks to the gear mechanism and machine being limited. To this end, control data are read in a multi-block handling procedure and prescribed desired speeds are approached as a speed upper-limit to be maintained as far as possible, and local speed limitations are approached in the form of target speeds at defined target points within the scope of the look-ahead procedure with small acceleration changes within the limits of the maximum permissible jolt. In this context, a speed-independent acceleration limitation can be left at a constantly high maximum value.

10 Claims, 2 Drawing Sheets

VELOCITY CONTROL WITH LIMITED JOLTING

This application is a National Stage of International Application PCT/EP95/03973 under 35 USC §371, filed Oct. 9, 1995.

FIELD OF THE INVENTION

The present invention relates to a method for controlling the speed of electric drives, in particular of machine tools or robots.

BACKGROUND INFORMATION

Modern drives, for example for use in machine tools or robots, are distinguished by high dynamics. The values for speed control, which are prescribed on the desired value side by the industrial controllers and frequently also include jumps in acceleration, therefore produce acceleration shocks to the machine. If a gear mechanism which is connected to such a machine has so-called slack effects, i.e. play between, for example, gearwheels, has come about, for example in the course of the operating time, the gear mechanism is suddenly relieved of load. Owing to the hysteresis-like profile of such a slide drive with slack, considerable oscillations on the machine may be brought about. Such oscillations are, however, undesired since, for example in the case of grinding, they lead to degradation of the surface quality or, in the case of laser cutting, they lead to degraded dimensional accuracy. For this reason, efforts are made to design the speed control of such a modern drive in such a way that jolts, deriving from acceleration over time, are limited as far as possible.

It is known that, in order to fulfill this requirement, in conventional methods for controlling the speed in machine tool controllers either speed-independent acceleration limitation is taken into account, which limits the possible axle acceleration independently of the respective rotational speed of the electric drive or the speed values are filtered by means of a smoothing time constant on the path and an additional smoothing means in the drive as described in European Patent Application No. 0 477 412 and U.S. Pat. No. 4,603,286.

These two conventional methods which are used as standard ways of controlling the speed in machine tool controllers have, however, the disadvantage that, on the one hand, the axial smoothing causes speed-dependant and acceleration-dependant contouring errors and thus degrades the contouring accuracy. The only remaining way of preventing such a contouring error is to reduce the path acceleration limit in order to reduce shock loads and jolt loads. However, on the other hand, a consequence of this is that the efficiency of the machine is not completely utilized.

SUMMARY OF THE INVENTION

The present invention is therefore based on the object of designing a method for controlling speed, in such a way that impacts to the gear mechanism and machine can be avoided and the excitation of the machine which produces oscillations is reduced in an adjustable manner, and, at the same time, however, the efficiency of the machine can, if possible, be utilized to the greatest possible extent. Moreover, the effect of such jolt limitation is to be that slack effects do not, if possible, occur or already existing slack effects are not amplified further in the course of operation.

According to the present invention, this object is achieved by means of the following features:

1.1 the path speed is controlled in such a way that a prescribed acceleration limit is approached in a plurality of steps whose number depends on the utilization of a maximum permissible jolt, and is thus kept at a constantly high value irrespective of the resulting overall acceleration change, 1.2 the speed control takes into account a desired speed profile which is prescribed over time, in which case, in a desired speed approach phase, the machine is adjusted to the desired speed as quickly as possible with optimum utilization of the maximum permissible acceleration and of the maximum permissible jolt, but with as few small jolt changes as possible, 1.3 the machine is operated at the desired speed in terms of a speed upper-limit which is to be maintained as long as possible, 1.4. local speed limitations at certain target points are approached in a look-ahead manner in a target approach phase, 1.5 the target approach phase is subdivided by reducing a still existing acceleration, if there is an existing travel margin reducing it to the desired speed and, finally, braking to target speed at the latest possible time with the smallest possible continuous jolt changes.

A first, particularly advantageous refinement of the present invention which operates particularly reliably has the following feature:

2.1 a possible travel margin is determined by specifying the required brake travel at all times in a look-ahead manner and comparing it with the travel distance still to be covered until the target point is reached.

A further advantageous refinement of the present invention permits its use over a wide speed range and has the following features:

3.1 the number of control data blocks, which are read in a look-ahead manner in the course of the multi-block handling procedure, is variable within the limits of the size of the data buffer used, 3.2 the multi-block handling unit becomes larger as the speed of the drive increases.

A further, particularly advantageous refinement of the present invention increases flexibility and has the following feature:

4.1 possible forward feed override values are taken into account in the look-ahead acceleration by maintaining a control margin, which is matched thereto.

A further advantageous refinement of the present invention permits desired speeds to be approached more precisely, and has the following feature:

5.1 with the exception of the first data block, the desired speeds are also read in a multi-block handling procedure and are approached in a look-ahead manner at the earliest possible time.

A further advantageous refinement of the present invention which increases the applicability of the present invention has the following feature:

6.1 the prescribed target speed and the target point can be changed at any interpolation clock cycle.

A further advantageous refinement of the present invention increases the accuracy and has the following feature:

7.1 whereas, in the desired speed approach phase, the acceleration increase, constant acceleration phase and acceleration decrease phase are changed using the interpolation clock, the desired speed is approached in synchronism with the clock within one clock cycle by means of a transition clock.

A further advantageous refinement of the present invention combines the advantages of desired speed approach phase and target approach phase by having the following feature:

8.1 if the brake travel determined in the target approach phase is too tight to run through the acceleration decrease phase, constant acceleration phase and braking phase individually, the procedure of the desired speed approach phase is used, and monitored in each clock cycle, until the standard pro-cedure for approaching the target point can be resumed.

A device for carrying out the method according to the present invention includes the following features:

9.1 the device is divided into an area, which operates in a block-specific manner, for analyzing the control data, and an area, which operates in a clock-specific manner, for controlling the speed, 9.2 the control data are fed via a signal preprocessing unit to a data buffer, 9.3 in the signal preprocessing unit, relevant speed parameters are determined from the control data in a noncyclical, block-specific preprocessing procedure and stored in the data buffer, which control data are simultaneously read in parallel by the controller within the scope of the multi-block handling procedure, 9.4 machine data, such as the speed-independent acceleration characteristic curve and the global machine speed limits and machine acceleration limits are supplied both to the signal preprocessing unit and to the controller, in order to determine the speed parameters, 9.5 the signals of an override control system are supplied to the controller in order to permit individual adaptations of the control procedure there and to include them in a correction of the speed control.

Some of the advantages which are achieved with the present invention are in particular that, as a result of the jolt limitation, the "signal edge steepness" of the acceleration change can be adjusted and impacts on the gear mechanism and machine can be minimized. The excitation of the machine which produces oscillations is reduced in an adjustable manner. In this way, even already existing slack effects can be handled in such a way that the oscillations caused at the machine are as small as possible. A consequence of this is that the contouring accuracy during processing is improved, for example a better surface quality in the case of grinding or a better dimensional accuracy in the case of laser cutting. This, in turn, provides the advantage that possibly existing slack effects are not increased, and therefore the play, for example between gearwheels, is kept as low as possible in the course of the operating time. Since the speed-independent path acceleration limit does not have to be reduced, for example in the case of curved contours, owing to severe jumps in acceleration, in order to prevent disruptive contouring errors, but instead can be kept at a constantly high value, this provides the advantage that the efficiency of the machine can be fully utilized at any time. In addition, the stated advantages can be realized particularly effectively and cost effectively with the present invention.

DETAILED DESCRIPTION OF THE INVENTION

Figure 1:
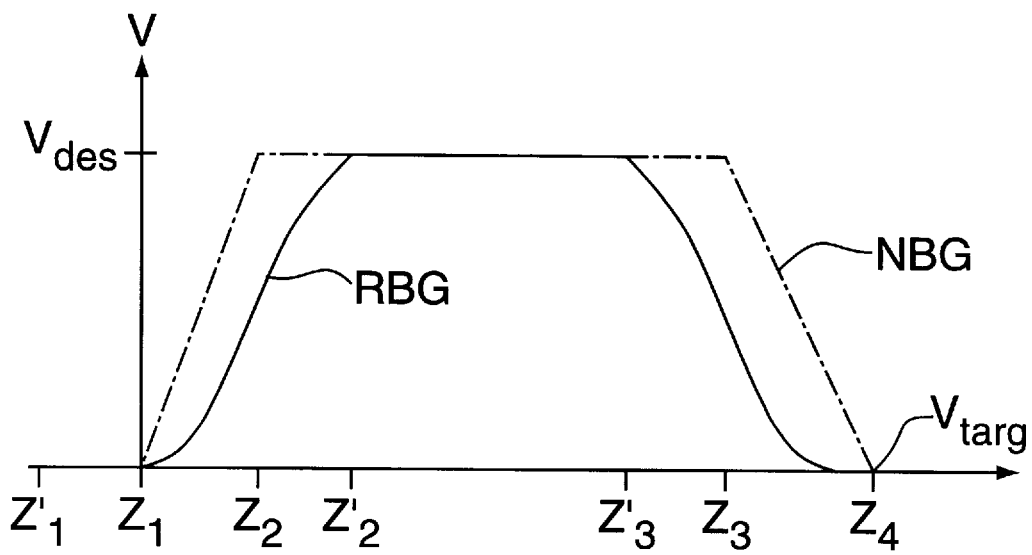
FIG. 1 shows the speed profile for approaching a prescribed desired speed with subsequent braking to a defined target speed at a defined target point taking into account the speed control with jolt limitation.

The illustration shown in FIG. 1 illustrates a diagram in which the profile of the speed V is plotted against time T. Here, the individual steps on the abscissa each describe an interpolation clock cycle. Two speed values are plotted on the ordinate. This is, on the one hand, a currently prescribed desired speed $V_{des}$ which is reached at the time $Z_2$ or $Z'_2$. Braking occurs to a second speed, the target speed $V_{targ}$, at a certain target point $Z_4$. Two different speed profiles for approaching these two speeds are illustrated in FIG. 1. A first speed profile, which occurs without the speed control with jolt limitation according to the present invention is the nonlimited speed profile NBG illustrated in the form of a broken line. The profile NBG shows that the speed starts at zero at a time $Z_1$ and increases linearly up to the prescribed desired speed $V_{des}$ at the time $Z_2$. Between the times $Z_2$ and $Z_3$ the nonlimited speed profile describes a constant value, the desired speed $V_{des}$ which is controlled in terms of a speed upper-limit which is to be maintained as long as possible. From the time $Z_3$ onwards, braking occurs linearly decreasing to the target speed $V_{targ}$ up to the target point $Z_4$, and the operation of the machine then continues at this target speed $V_{targ}$. The second speed profile RBG, illustrated with an unbroken line, represents the profile of the speed using the speed control with jolt limitation according to the present invention.

Owing to the aimed-at jolt limitation, the speed is not increased with maximum gradient, but instead only gradually, likewise starting from $Z_1$ in order ultimately to enter a phase of relatively high speed increase. Before the desired speed $V_{des}$ is reached at the time $Z'_2$, the increases in speed are reduced again. However, when the desired speed is reached, there is a slight kink even in the speed profile RBG with jolt limitation. Owing to the jolt limitation, the desired speed is therefore not reached until a later time $Z'_2$ than in the case of NBG. Subsequently, RBG also runs at the desired speed for as long as possible, before the approaching of the prescribed target speed $V_{targ}$ takes place at the latest possible time $Z'_3$. Here, the speed profile is controlled in accordance with the speed increase of RBG, but now in the form of a speed decrease. In contrast with the nonlimited speed profile NBG, the decrease in speed with the speed profile RBG with jolt limitation starts, in a look-ahead manner, even before the time $Z_3$, namely at the time $Z'_3$, owing to the multi-block handling procedure. Time $Z'_1$ designates the point starting from which the speed control RBG with jolt limitation ought to start acceleration if the desired speed $V_{des}$ is to be reached, as is the case already at the time Z2 with the nonlimited speed control NBG.

Figure 2:
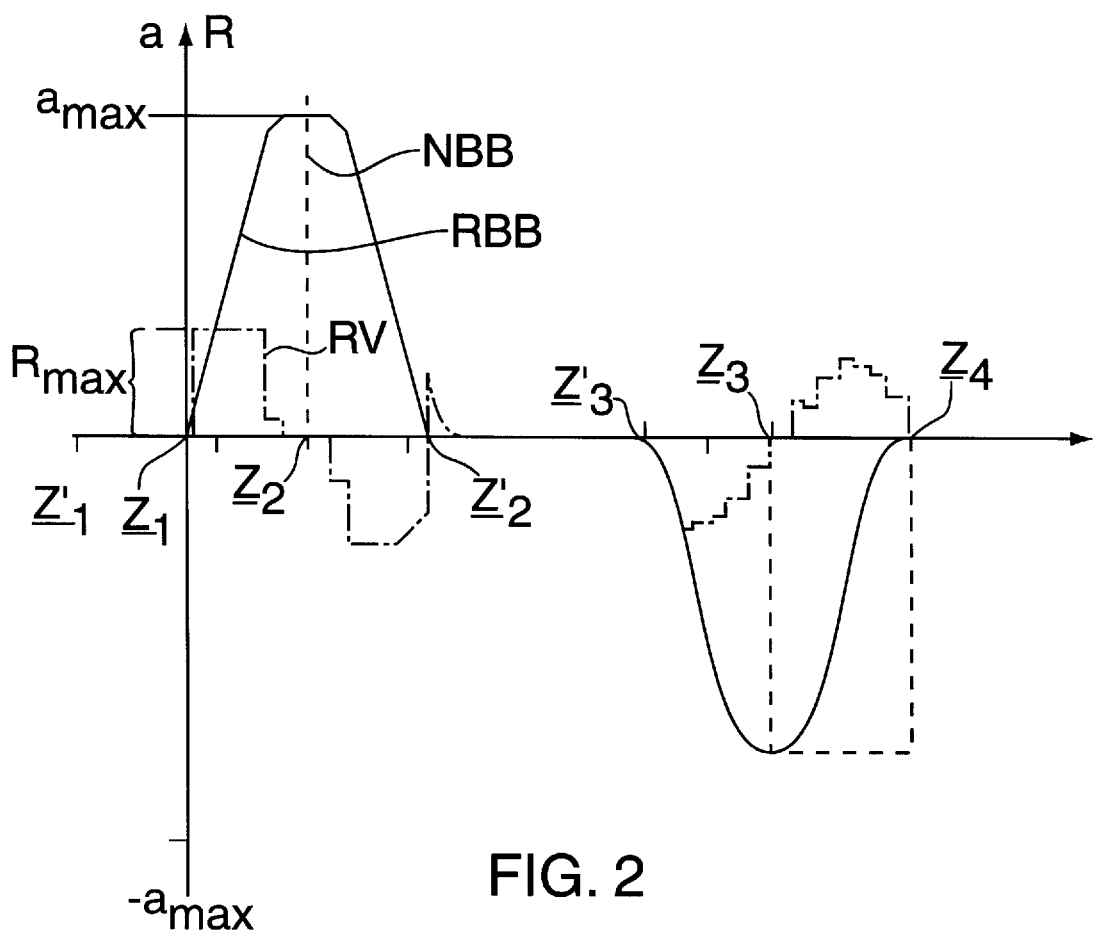
FIG. 2 shows the acceleration profile for actuating a prescribed desired speed and braking to a target speed at a defined target point taking into account jolt limitation, which is also illustrated.

The illustration shown in FIG. 2 illustrates a diagram in which the acceleration a for the speed profile from FIG. 1 is plotted for the time T. Here, all the times on the time axis T correspond to the times on the time axis T from FIG. 1. The same applies to the corresponding interpolation points $Z_1$, $Z_2$, $Z_3$, $Z_4$, $Z'_1$, $Z'_2$, $Z'_3$ and $Z'_4$, to which the respectively underlined, synonymous designations correspond. By analogy with the nonlimited speed profile NBG from FIG. 1, the profile of the acceleration resulting from the aforesaid speed profile, the nonlimited acceleration profile NBB, is illustrated by a broken line. The acceleration increase up to the time $Z_1$, runs directly in the form of a jump from the acceleration ZERO up to the maximum acceleration $a_{max}$ and retains this value until the time $Z_2$ is reached. Since the prescribed desired speed $V_{des}$ is thus reached, the acceleration drops directly from the acceleration upper-limit $a_{max}$ to the value ZERO. In accordance with the constant speed profile on the speed upper-limit, the prescribed desired speed $V_{des}$, the acceleration in this area is ZERO. In order to brake the prescribed desired speed $V_{des}$ to the target speed $V_{targ}$ at the defined target point $Z_4$, the nonlimited acceleration profile NBB describes a jump to the negative acceleration $-a_{max}$. When the speed $V_{targ}$ is reached, the acceleration at the time $Z_4$ drops back to the value ZERO.

An acceleration profile RBB, illustrated in the form of an unbroken line in FIG. 2, with a jolt limitation and corresponding to the speed profile RBG with jolt limitation from FIG. 1, describes a trapezoidal shape, in contrast with the nonlimited acceleration profile NBB for the desired speed approach phase. The acceleration is increased linearly in an acceleration increase phase, utilizing the maximum permissible jolt $R_{max}$, and is maintained at this value. Before the maximum acceleration $a_{max}$ is reached, the acceleration increase is reduced with a transition clock and ultimately kept constant at $a_{max}$ in a constant acceleration phase. Before the prescribed desired speed $V_{des}$ is reached, an acceleration decrease phase follows, in which phase the acceleration is reduced linearly from the maximum value $a_{max}$, again in accordance with a transition clock.

The corresponding profile of the jolt RV is illustrated in a dot-dash line, and in the acceleration approach phase it exhibits a jump to the maximum jolt $R_{max}$, ultimately drops in the transition clock cycle and is ZERO during the constant acceleration phase. Subsequently, the same profile occurs in the negative range, that is to say mirror-inverted along the abscissa.

With regard to the acceleration profile RBG with jolt limitation, the profile runs on, during the constant phase, to $V_{des}$ from RBG between $Z_2$ and $Z'_3$ with acceleration ZERO. In the target approach phase, RBG ultimately describes a polynomial profile with the acceleration being continuously reduced to $-a_{max}$, in each case with the smallest possible acceleration changes, which is represented by the small jumps in the profile of the jolt RV. From said value $-a_{max}$ the acceleration is likewise increased again successively with the smallest possible acceleration changes until the value ZERO is reached at the time $Z_4$. Owing to the acceleration increase, the corresponding jolt profile RV runs in the positive range and has, as was also the case previously in the negative range, only small jumps owing to the only slight acceleration changes.

Figure 3:
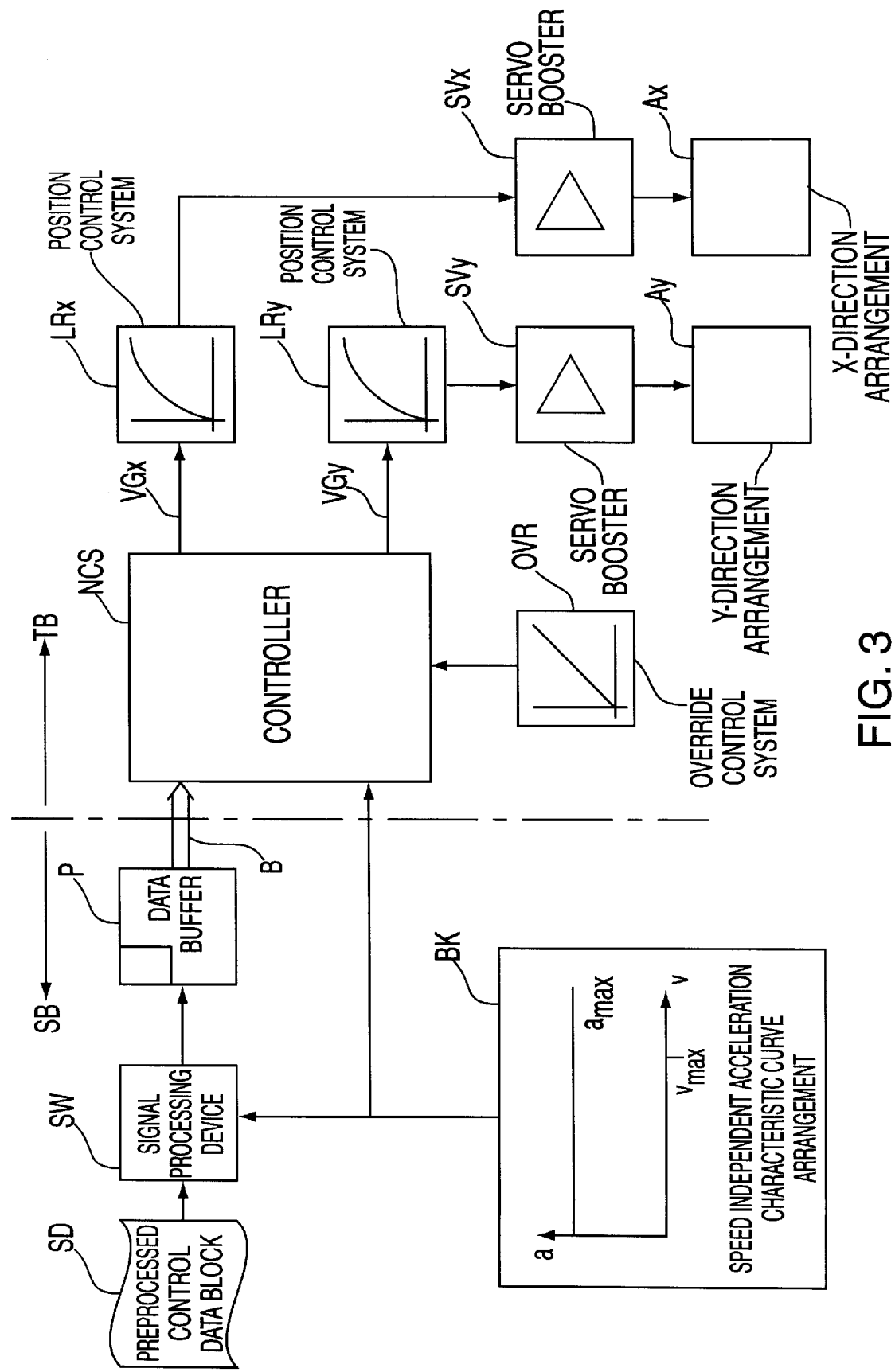
FIG. 3 shows a block diagram of a device for speed control with jolt limitation according to the present invention.

As shown in FIG. 3, a block diagram illustrates a possible device for speed control with jolt limitation according to the present invention. The device is divided into an area SB which operates in a block-specific manner, which is located at the start of processing, and an area TB which operates in a clock-specific manner, the limit being placed between the data buffer P and the controller NCS. For the purpose of the multi-block handling procedure, the control data SD are buffered in a buffer P which can hold values for a prescribed number of blocks. However, the data blocks are not fed directly into the buffer P but instead speed parameters are already extracted beforehand in a signal preprocessing device SVV. The speed parameters are then fed into the buffer P and have the advantage that they require less storage space than the original data block. At the output of the buffer P, its values are fed to the NC controller NCS in parallel via a data bus B.

Information on the machine data which are required to determine the preprocessed speed parameters, such as $a_{max}$ and $V_{max}$, for example, are supplied to the signal preprocessing unit SVV. Furthermore, the speed-independent acceleration characteristic curve BK used must be known. All these data are represented by the unit BK and are also fed to the controller NCS, where they are required for speed control. Moreover, the signal of an override control system OVR is supplied to the NC controller NCS. The prescribed values VGx and VGy calculated there are supplied to one position control system LRx and LRy each. From there, the corresponding drive signals, for example for a slide drive in the X and Y directions, are fed via in each case one servo booster for the drive in the X direction SVx to the drive in the X direction Ax and for the Y direction via the servo booster SVy to the drive in the Y direction Ay.

In order to realize a speed control with jolt limitation according to the present invention, the path speed V is controlled in such a way that a speed-independent path acceleration characteristic curve BK is taken into account. Jolt is understood here to be the derivation of the acceleration a over time T. In addition to the acceleration limitation $a_{max}$, the following prescribed desired values are also taken into account. On the one hand, a currently prescribed desired speed $V_{des}$, which is approached in terms of a speed upper-limit which is to be maintained as long as possible, utilizing the maximum permissible acceleration limit $a_{max}$ or jolt limit $R_{max}$. Furthermore, a target speed $V_{targ}$, which is to be reached at a precisely defined target point, is taken into account. Braking occurs to this target speed $V_{targ}$ at the latest possible time in a look-ahead manner such that the target speed $V_{targ}$ is reliably reached at the target point $Z_4$ with an acceleration of ZERO. To this end, the speed control according to the present invention operates, as far as approaching the target speed is concerned, according to a multi-block handling procedure or with "look ahead", which means that not only the current control data of a data block are used for speed control but, even at this time, the control data of one or more following blocks are also used for the speed control. A device for carrying out the method according to the present invention is divided into two areas, namely an area SB which operates in a block-specific manner and an area TB which operates in a clock-specific manner. The clock-specific area includes the essential elements for speed control, while the block-specific area includes the measures of the "look ahead". Since the block-specific area SB runs through a slower cycle than the clock-specific area TB, because a block decomposes into a large number of clock cycles, in the block-specific area it is actually possible to perform, within the scope of a preprocessing procedure, calculations which relieve the loading on the speed control, with critical timing, in the clock-specific area. Accordingly, in a data buffer P which connects these two areas, and which is explained in more detail below, the limit between the two areas is also placed between a preprocessing unit SW on the side which operates in a block-specific manner and the controller NCS on the side which operates in a clock-related manner. In this context, the data buffer P can be assigned to one of the two sides depending on the definition. In FIG. 3, e.g., the data buffer is assigned to the block-specific side.

Within the scope of the "look ahead", the data of blocks which are to be read in a look-ahead manner are preprocessed in the non clock-related, block-specific phase SB by determining speed parameters which are required for the following processing steps, as far as possible at this actual point. However, this requires knowledge of the specific machine data. For this reason, these data are fed not only to the controller NCS, but also to the signal preprocessing unit SW. Such machine data comprise for example the global machine axle speed limits $V_{max}$ and machine axle acceleration limits $a_{max}$ and $-a_{max}$, respectively. Furthermore, the profile of an implemented acceleration characteristic curve must be known. In the present case, a speed-independent acceleration characteristic curve BK is used whose profile runs, according to the present invention, at a constantly high level at the acceleration limit $a_{max}$ at all times independently of the difficulty of the contour to be fabricated. However, the present method can also be used in conjunction with any other profile of an acceleration limitation, in particular of a speed-dependent acceleration limitation.

The values determined in the preprocessing are stored in a data buffer P. From there, the actual NC controller NCS can read, in parallel via a data bus B, both the preprocessed speed parameters of the current data block as well as those of the data blocks read with a multi-block handling procedure, in order to calculate a speed control with jolt limitation according to the present invention. In this way, local speed limitations can be approached in a look-ahead manner from the speed profile which is prescribed over time and which the control data SD describe.

So that a person operating the controller can manually optimize and adapt for example the workpiece to the technological conditions, a forward feed override is allowed for, that is to say the possibility of varying the absolute forward feed proportionally in a range for example between 0 and 200% is allowed for. The consequence of such an override can thus be that the conditions are changed, especially in the case of braking to target speed $V_{targ}$. In order to be able to allow for this at the correct time, the information of the override control system OVR is supplied directly to the controller NCS. In order to enable an override to be allowed for, a control margin is maintained in the system by making the maximum acceleration capability $a_{max}$ used lower than the maximum possible acceleration of the drive used.

The prescribed values VGx and VGy which are determined in the controller with the aid of this information are fed to one position control system LRx and LRy each, separately for each dimension, illustrated here in simplified form with reference to a two-dimensional system, however, any desired number of dimensions can be used. The indices x and y distinguish the respective dimension. Ultimately, the control values are supplied to the individual drives Ax and Ay via in each case one servo booster SVx and SVy. So that look-ahead braking to target speed $V_{targ}$ with acceleration ZERO at the latest possible time is ensured at any time when the target point is reached, the "look ahead" or the width of the multi-block handling procedure is varied with the speed of the forward feed of the corresponding electric drive. For example, at a low forward feed speed of the electric drive, it is sufficient to buffer the speed parameters of a small number of data blocks, for example two data blocks, in the buffer P, in order to ensure the look-ahead braking procedure. However, as the forward feed speed increases, it becomes necessary, within the limits of the size of the data buffer P used, to increase the number of preprocessed control data blocks SD read in a look-ahead manner, in comparison with the small number of data blocks SD processed at low speed. In order to cover the widest possible speed range, it is thus recommended to make the data buffer P to use such a size that the preprocessed speed parameters of a sufficient number of control data blocks SD can be stored. A buffer size which is sufficient according to the present invention has a storage capability for the speed parameters of between 10 to 50 control data blocks.

In order to approach a prescribed desired speed $V_{des}$, the acceleration a is controlled in a plurality of different phases. At the start of a desired speed approach phase at the time $Z_1$ there is the acceleration increase phase. Here, the acceleration is increased with optimum utilization of the maximum permissible jolt $R_{max}$, since the desired speed $V_{des}$ is to be reached as quickly as possible irrespective of an initial acceleration which may already be present. The resulting speed profile RBG with jolt limitation thus increases continuously with constantly rising acceleration, the jolt profile RV being constant.

Before the acceleration upper-limit $a_{max}$ is reached, the acceleration increase is reduced, accompanied by a negative jolt, which is smaller than the maximum permissible jolt $R_{max}$. This serves to provide a transition to $a_{max}$ which is as steady as possible. In the subsequent constant acceleration phase, RBB is continuously adjusted to $a_{max}$ from ZERO with a constant jolt. The speed profile RBG with jolt limitation rises linearly in this phase with constant speed increases. In an analogous way, this is followed by the acceleration decrease phase, in which case, in the case of the acceleration profile RBB with jolt limitation, the acceleration is slightly decreased from $a_{max}$, only with a slight negative jolt, and is then decreased linearly to an acceleration from ZERO with a correspondingly larger negative jolt which, however, lies in the permissible range. The three described phases of acceleration control have the common feature that the jolt is only changed in the interpolation clock cycle in all cases.

When the desired speed is reached at the time Z'2, the problem arises that $V_{des}$ is to be reached as far as possible in synchronism with the clock at the acceleration ZERO. For this purpose, in the desired speed approach phase, there follows a fourth subphase in which the machine is adjusted to $V_{des}$ in synchronism with the clock within one clock cycle using a transition clock. For this reason, within this clock cycle there is a jump in the jolt profile RV. The messiness which this brings about in the jolt profile is, however, acceptable in comparison with the advantage achieved. The resulting curve of the acceleration RBB with jolt limitation thus has the shape of a trapezium whose limbs have a slight kink in each case before the shorter base side is reached.

If these profiles of speed RBG and acceleration RBB with jolt limitation are compared with profiles of NBG and NBB which do not have jolt limitation and which are illustrated in the form of broken lines in FIG. 1 and FIG. 2, it becomes clear that the desired speed could be reached even at the time $Z_2$ if the acceleration a were suddenly set to $a_{max}$ at $Z_1$. Although this resulted in a linear rise in the speed with a corresponding maximum increase in the entire range of the acceleration increase, such a sudden increase in the acceleration from ZERO to $a_{max}$ results in an infinite jolt. Apart from the fact that such a jolt profile is technically not possible, this indicates clearly the considerable jolt loading of even a realistically approximated profile without jolt limitation.

According to the present invention, the machine is operated at the desired speed $V_{des}$ reached for as long as possible as a speed upper-limit in order, with adaptation to the technical requirements of the processed workpiece, to reach, for as long as possible, an optimum forward feed which requires the desired speed to be deviated from only as a result of local speed limitations, for example because of critical contours such as nontangential areas. For this reason, target speeds are taken into account at precisely defined target points which are approached, in a look-ahead manner within the scope of the multi-block handling procedure, with the speed parameters determined in the signal preprocessing means. Since changes may become necessary, for example, in the event of block reloading faults, it is possible to change the prescribed target speed, and the target point, at every interpolation clock cycle, that is to say every time a new interpolation node is calculated. The target approach phase itself is divided into three phases. The first of these, an acceleration decrease phase, follows directly the time $Z_2$ when the desired speed $V_{des}$ is reached. When this occurs, a positive acceleration which may still be present and which has a constant maximum jolt is decreased to ZERO. Such a situation occurs especially when the target approach phase is initiated, or has to be initiated, before the desired speed is actually reached. This situation is not illustrated in FIG. 2 for the sake of better clarity. Instead, the acceleration decrease phase is then dispensed with there because the desired speed has already been reached before the target point is approached.

The acceleration decrease phase is followed by a constant speed phase which, in FIGS. 1 and 2, occurs between the times $Z_2$ and $Z'_3$. As a rule, this phase is run at the prescribed desired speed. Only if it was not possible to reach the latter is the corresponding instantaneous speed used as a basis. The third phase, the actual braking phase, is thus always parametrized starting from an acceleration from ZERO and ends, for its part, again with an acceleration from ZERO. Here, the acceleration is gradually reduced in a continuous manner to $-a_{max}$ starting from point $Z'_3$, in each case with the fewest possible continuous jolt changes in a polynomial profile, and is likewise again increased from the above-mentioned value to an acceleration from ZERO at the target point $Z_4$. This is thus a speed transition from acceleration ZERO to acceleration ZERO. However, the travel distance covered in the braking phase is not prescribed, since the machine is run according to the criterion on a profile which is as jolt free as possible, and not according to that of shortest possible travel. The required travel distance for the braking phase thus differs from braking procedure to braking procedure, but can easily be determined.

So that it is ensured that the braking phase is terminated when the target point is reached, a latest possible time $Z'_3$ at which the braking phase must start is determined. In order to determine the latest possible time for the braking procedure, the transition to the target approach phase is always triggered at such an early point that there is still a travel margin, in FIGS. 1 and 2 the section between $Z_2$ and $Z'_3$. Such a travel margin is determined by specifying the required brake travel in a look-ahead manner at all times and is compared with the travel distance still to be covered before the target point $Z_4$ is reached. If this results in a positive difference, this constitutes the existing travel margin. If the brake travel, determined in this way, which is available for the target approach phase is too tight, there is thus no travel margin and the acceleration decrease phase, the constant speed phase and the braking phase cannot be run through individually. In this case, the procedure of the desired speed approach phase is used until continuous checking reveals that the standard procedure for approaching the target point can be resumed.

Such a case occurs for example if a new decisive target point, which is less restrictive but yet requires to be approached immediately, is determined at the block change within the scope of the multi-block handling procedure. Frequently, in such a case, it is not possible at first to decrease a still present acceleration in the acceleration decrease phase before starting the braking phase, since the brake travel would expand too far. For this purpose, as in the case of approaching a desired speed, the target speed is approached directly and it is monitored at every clock cycle whether a transition can be made to the standard method.

In a further advantageous embodiment, not only target speeds $V_{targ}$ but also desired speeds $V_{des}$ are approached with a multi-block handling procedure, and thus in a look-ahead manner, at the earliest possible time. Since such a procedure cannot logically be carried out until the second data block, the first data block is approached according to the conventional method, as presented above.

We claim:

1. A device for controlling the speed of electric drives, comprising:

a data buffer;

a controller;

a first area operating in a block-specific manner for analyzing a control data, the first area including a signal preprocessing unit; and a second area operating in a clock-specific manner for controlling the speed, the control data being feedable via the signal preprocessing unit to the data buffer, wherein the signal preprocessing unit determines relevant speed parameters with the control data, the relevant speed parameters being determined using a noncyclical block-specific preprocessing procedure and being stored in the data buffer, the control data being simultaneously read in parallel by the controller using a multi-block handling procedure, wherein a machine data is fed to the signal preprocessing unit, and then to the controller for determining the relevant speed parameters, and wherein output signals of an override control system are fed to the controller so that individual adaptations of a control procedure can be performed to correct the speed control.

2. The device according to claim 1, wherein the electric drives reside in one of machine tools and robots.

3. The device according to claim 1, wherein the machine data includes at least one of speed-independent acceleration characteristic curve data, global machine speed limit data and machine acceleration limit data.

4. A method for controlling a speed of an electric drive, comprising the steps of:

in a desired speed approach phase, controlling a path speed to substantially reach a predetermined acceleration limit by optimally utilizing a maximum permissible jolt factor, the path speed being controlled for adjusting a machine to a desired speed with a least number of jolt changes, the path speed being controlled as a function of a profile of the desired speed prescribed over time;

in a target approach phase, analyzing local speed limitations at predefined target points which are approached using a look-ahead method, wherein the target approach phase is subdivided into an acceleration decrease phase, a constant speed phase and a braking phase;

determining a possible travel margin by continuously determining a required braking distance using the look-ahead method and by comparing the required braking distance with a travel distance to be traveled to reach a target position;

starting the acceleration decrease phase when the required braking distance can be under-reached, the acceleration decrease phase being started, at the latest, when an acceleration operation at a reached acceleration limit does not allow the predetermined desired speed to be exceeded, wherein the acceleration decrease phase is started by decreasing a built-up acceleration to zero using a maximum jolt factor;

when a travel margin is present and during the constant speed phase, reducing the possible travel margin to the desired speed that is reached using a maintained speed upper-limit;

at a latest possible time and during the braking phase, steadily reducing an acceleration to reach a negative acceleration limit using minimal continuous jolt changes; and thereafter, raising the acceleration from zero to the target position so that the path speed is decreased to reach the local speed limitations at the target position.

5. The method according to claim 4, wherein the method controls the speed of one of machine tools and robots.

6. The method according to claim 4, further comprising the steps of:

reading a variable number of control data blocks which are read using the look-ahead method during a multi-block handling procedure, the variable number of control blocks being limited by a size of a data buffer; and increasing the multi-block handling procedure when the speed of the electric drive increases.

7. The method according to claim 6, further comprising the step of:

reading the predetermined desired speeds in the multi-block handling procedure without reading a first data block, the desired speed being approached using the look-ahead method at an earliest possible time.

8. The method according to claim 4, further comprising the step of:

maintaining a control margin for a look-ahead acceleration as a function of forward feed override values, the control margin being matched to the forward feed override values.

9. The method according to claim 4, further comprising the step of:

modifying the predetermined target speed and the target position at a desired interpolation clock cycle for a clock-controlled speed control.

10. The method according to claim 9, further comprising the step of:

in the desired speed approach phase, increasing the acceleration, and changing a constant acceleration phase and the acceleration decrease phase using the desired interpolation clock cycle, the desired speed being substantially reached synchronously with the clock being within one clock cycle using a transition clock.

* * * * *